United States Patent [19]

Fearing

[11] Patent Number: 4,741,117

[45] Date of Patent: May 3, 1988

[54] ANIMAL EAR TAG

[75] Inventor: D. Michael Fearing, St. Paul, Minn.

[73] Assignee: Fearing Manufacturing Co., Inc., South St. Paul, Minn.

[21] Appl. No.: 922,265

[22] Filed: Oct. 23, 1986

[51] Int. Cl.4 .............................................. G09F 3/00
[52] U.S. Cl. ...................................................... 40/301
[58] Field of Search ........................ 40/300, 301, 302; 119/156; 63/12

[56] References Cited

U.S. PATENT DOCUMENTS 3,214,856  11/1965  Brierley ................................ 40/301

FOREIGN PATENT DOCUMENTS

| 31227 | 7/1981 | European Pat. Off. | ............. 40/301 |
| 123506 | 10/1984 | European Pat. Off. | ............. 40/301 |
| 166485 | 1/1986 | European Pat. Off. | ............. 40/301 |
| 2412258 | 8/1979 | France | ................. 40/300 |
| 84/00468 | 2/1984 | PCT Int'l Appl. | ................. 40/301 |

Primary Examiner—John J. Wilson
Assistant Examiner—Cary E. Stone
Attorney, Agent, or Firm—Jacobson and Johnson

[57] ABSTRACT

An animal identification tag having a stud for piercing the ear of an animal with the stud including a shaft of hard resilient material for extending through the ear of an animal and an ear-piercing tip of hard resilient material attached to one end of the shaft with the ear-piercing tip having sufficient hardness to permit an operator to force the ear-piercing tip through the ear of an animal and a retaining flange of hard resilient material extending out from the shaft to prevent withdrawal of the stud from an animal's ear with a retaining flange of flexible material attached to the retaining flange or hard resilient material so the flanges coact to thereby reduce snagging of the animal ear tag.

14 Claims, 2 Drawing Sheets

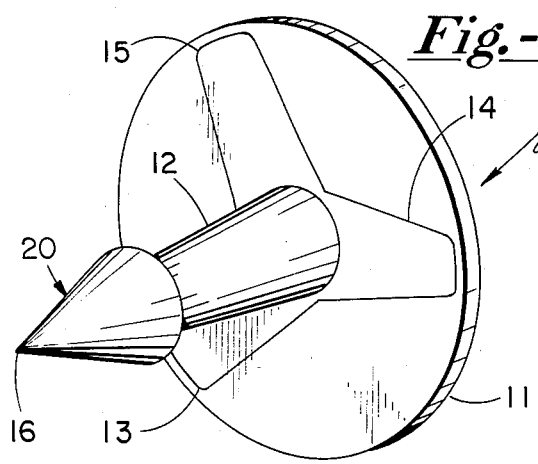
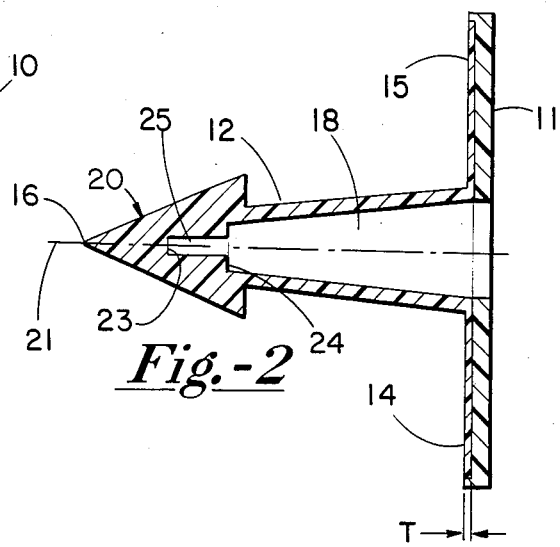
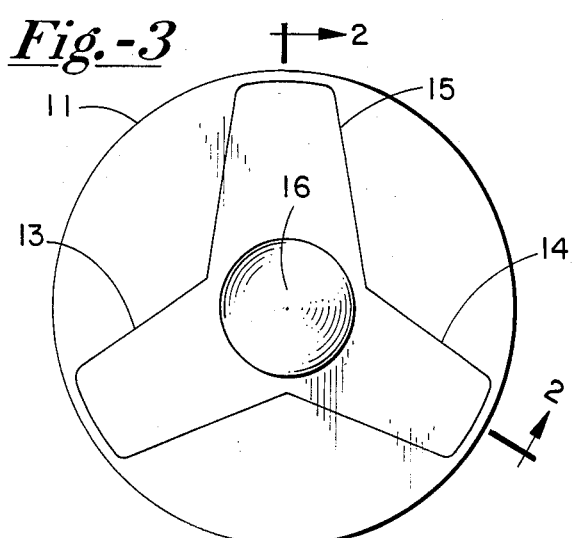
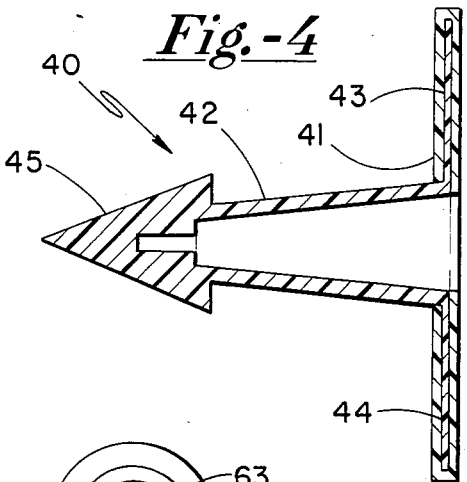
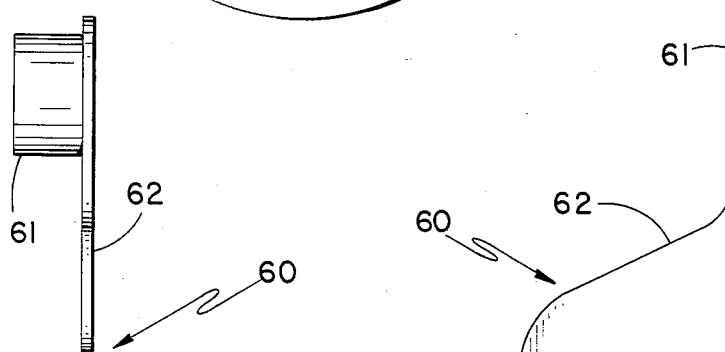
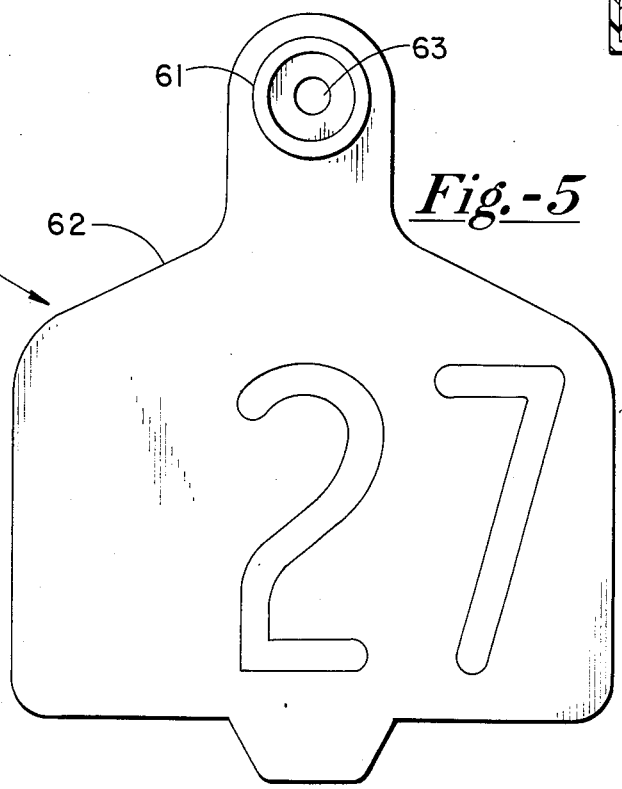

ANIMAL EAR TAG

FIELD OF THE INVENTION

The loss of livestock identification ear tags is a major problem for producers who rely on ear tags for both record keeping and to prevent animal mixups. It is well known that the primary loss of ear tags is usually caused as a result of the tag snagging in brush, fencing, or feeders. In order to minimize the loss of ear tags, most producers use flexible animal ear tags which are made from polyurethane. It is not well known that there are other causes for loss of ear tags. Those losses which may be considered delayed losses or secondary losses are due to deterioration of the polyurethane as a result of prolonged exposure of the ear tag to an environment that includes bacteria that reacts with the polyurethane materials to structurally weaken the ear tags. This invention relates to improved animal ear tags which minimize secondary losses due to deterioration of the materials while also minimizing the primary losses associated with snagging.

BACKGROUND OF THE INVENTION

When animal ear tags were first developed, the best available tag material was metal. To minimize snagging and consequently, loss of ear tags, the metal tags were made very small. Since the tags were small, they were very difficult to read and usually could only be read by restraining the animal. A typical metal ear tag is shown in Burgess U.S. Pat. No. 1,011,911. Although the small metal tags provided less of an area to snag, they were not resilient so if snagged, they would usually tear free from the ear.

With the advent of plastics, the metal tags began to be replaced by larger and more resilient plastic tags. One such prior art tag is shown in Ritchey U.S. Pat. No. 3,552,051. The Ritchey one-piece flexible plastic ear tag was made of polyurethane, resisted snagging, had large, easy-to-read numbers, and permitted adding color as an added identification feature. The one-piece flexible tags were applied with a knife-like applicator which required a certain amount of practice before the operator could quickly apply the one-piece ear tag. Although ear tag loss was greatly reduced with one-piece flexible tags, consumers preferred the use of plier-like applicators to apply two-piece animal ear tags since it required less skill to learn how to apply a flexible or resilient two-piece tag with a plier-like applicator.

Somewhat prior to and during the development of the flexible one-piece tags, nonflexible two-piece tags, partially flexible tags and flexible two-piece tags with a hard earpiercing tip were also developed. The two-piece flexible tags have generally received greater consumer acceptance since they were installed with a plier-type applicator which required little time or skill to operate.

Early models of plastic tags included a flexible, usually polyurethane identification panel with a boss end and a rigid plastic male button for piercing the ear and holding the identification panel in place by the boss. Such an animal ear tag is shown in Hayes U.S. Pat. No. 3,260,007.

It is commonly known that retention of tags with a flexible panel and rigid stud is not as good as retention of flexible one-piece tags because the rigid button often snags and tears free from the ear. Stud improvements helped to solve this problem through the development of a resilient stud that is applied with a plier that has an ear-piercing pin extending from the jaw. An example of such a stud is shown in Goldberg's South African application No. 64/2254 filed May 6, 1964 and Murphy, et al. U.S. Pat. No. 3,741,414. The Murphy, et al. U.S. patent shows the combination of a resilient stud and a flexible panel. Although snagging problems and consequently primary ear tag loss was reduced with the all-flexible tags made of polyurethane, we have discovered the secondary tag losses caused by polyurethane deterioration from exposure to such elements as UV light, chemicals, fungus and bacterial remained a problem. Nevertheless, of all ear tag materials available today, polyurethane is still considered by most tag manufacturers and producers to be the best material available for manufacturing tags that have minimal field loss.

One of the reasons flexible polyurethane ear tags minimize ear tag loss is due to the flexibility of the tag which permits the tag to bend and flex thus avoiding snagging on objects. For example, when animal ear tags are inserted in an animal's ear, the ear tag irritates the ear, causing the animal to rub the ear against an object which often results in dislodging the ear tag. If the tag is flexible, it will usually not snag since the tag will flex rather than snag.

While the all-flexible tags made from polyurethane have been found to minimize snagging problems associated with the animal rubbing its ear, we have also discovered the polyurethane material used to make such tags will, after extended use, begin to break down after prolonged exposure to bacteria and sunlight. In addition, cuts in the ear tag from barb wire will accelerate the loss problem. Typically, anywhere after a year of use we observed that some of the all-flexible polyurethane ear tags were beginning to fall off.

Observations of polyurethane tags that have been lost after field use of a year or more shows deterioration of the male studs most often occurs at the base of the shaft with the stud. This junction of the shaft with the stud flange is usually the weakest point of the tag, and the point where the tags receive the most stress if snagged. This junction is also more susceptible to being cut by barb wire.

In order to minimize these secondary losses due to polyurethane deterioration, it would be desirable to replace the polyurethane with another material that is less susceptible to long term deterioration, based on evolution of studs from hard material to studs made of more flexible material. It seemed unlikely that one could use harder materials that were resistant to breakdown and still have minimal initial ear tag loss.

BRIEF SUMMARY OF THE INVENTION

Briefly, the invention comprises a stud for piercing the ear of an animal with the stud formed of a hard resilient material which has a head that is sufficiently rigid to provide penetration of an animal's ear and a two-part retaining flange having a first flange portion formed from the hard resilient stud material and a second flange portion of more flexible material that coacts with the first flange portion to provide a retaining flange that reduces ear tag loss due to snagging. The second flange also serves as a visual indicator to let the operator know that there is no breakdown of the polyurethane.

BRIEF DESCRIPTION OF THE DRAWINGS

FIG. 1 is a perspective view of the stud of my invention;

FIG. 2 is a cross-sectional view of the stud shown in FIG. 3;

FIG. 3 is a front view of the stud of FIG. 1;

FIG. 4 is a cross-sectional side view of an alternate embodiment of stud of my invention;

FIG. 5 is a front view of an identification panel;

FIG. 6 is a side view of the identification panel of FIG. 5; and

DESCRIPTION OF THE PREFERRED EMBODIMENT

Figure 7:
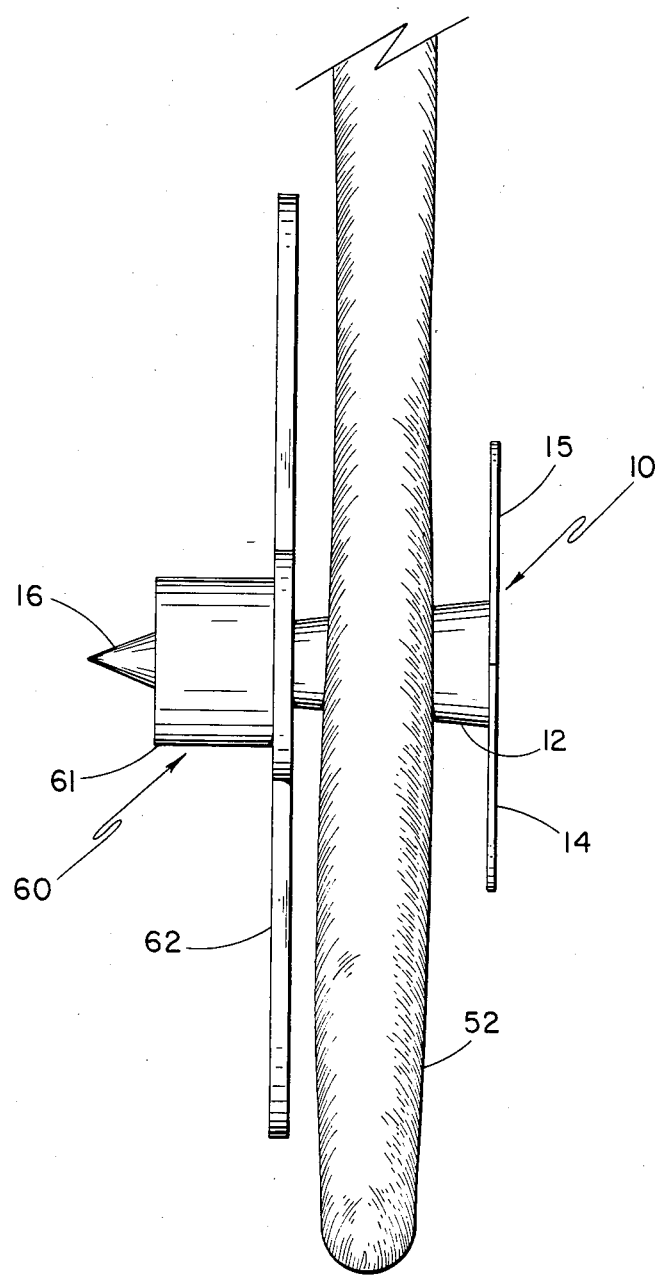
FIG. 7 is a side view of the identification panel and stud attached to the ear of an animal.

Referring to FIGS. 1, 2 and 3, reference numeral 10, generally identifies the improved stud of the present invention. Stud 10 comprises a slightly tapered hollow shaft 12 having on one end an ear-piercing conical tip 20 with an ear-piercing point 16. Located on the opposite end of hollow shaft 12 are a set of three retaining flanges 13, 14 and 15 which extend radially outward from the axis 21 of shaft 12. Ear-piercing tip 20, shaft 12 and flanges 13, 14 and 15 are molded in a single piece from a hard but resilient material such as a polycarbonate resin. A suitable polycarbonate is sold by G.E. under the trade name LEXAN. Attached to the back of retaining flanges 13, 14 and 15 is a flexible disk member 11 which is either molded to members 13, 14 and 15 or secured thereto through other means.

FIG. 2 shows a cross-sectional view of stud 10 illustrating the equally spaced location of flanges 13, 14 and 15 as they are fastened to flexible member 11. It should be pointed out that the hard resilient material that forms the head, shaft and flanges of stud 11 comprises a hard resilient material which has sufficient hardness to permit one to pierce an animal's ear while flexible member 11 of the stud is made from a flexible material such as polyurethane or the like.

In the embodiment shown in FIG. 2, the interior of stud 10 is provided with a conical tapered section opening 18 for receiving a tapered guide pin, however, if desired, the shaft could be straight as well as tapered. Located at the end of opening 18 is a recess 25 that has a shoulder 23 for the head of a guide pin. Similarly located at the end of opening 18 is a shoulder 24. Shoulders 23 and 24 permit one to transfer force to the ear-piercing head 20 to permit forcing the ear-piercing head 20 through an animal's ear and into the opening in a female member. If desired the driving force can be applied at the base of stud 10 since the hard stud has sufficient rigidity to transmit force from the base of the stud to the head of the stud. While the embodiment of FIG. 2 is shown with a solid conical tip, if desired the tip could be provided with an opening extending through it for insertion of an ear-piercing guide pin completely through the stud.

FIG. 3 shows an end view of the stud illustrating the centering of the stud tip with respect to flexible member 11. An alternate embodiment of the stud is shown in FIG. 4 and is identified by reference numeral 40, which has a conical head 45. FIG. 4 shows the wing-like radial extensions or retaining flanges extending substantially at right angles from shaft 42 to comprise members 43, 44 and a third member, not shown. The embodiment of FIG. 4 differs from the embodiment of FIG. 2 in that the wing-like flanges of FIG. 4 are embedded in annular flexible member 41 while the retaining flanges of FIG. 2 are not embedded in the annular flexible member 11. Annular flexible member 41 is made of a flexible material such as polyurethane and actually encapsulates the retaining members extending from shaft 42. In the embodiment of FIG. 4, flexible member 41 can be molded around the extending retaining flanges. The flange wings are descrbed as embedded into the annular flexible member 41. They can also be sonically welded, dielectrically welded, or further embedded between the molded polyurethane disc base and a film. Likewise, an adhesive process can be used for bonding or melding the wing-like flanges to the flexible member. While not thoroughly understood, it is believed the annular flexible polyurethane flange, when attached to the wing-like flanges, acts as an arm muscle flexor, and assists in pulling the flanges back after they are snagged. In addition, the flexible members prevent the flanges from bending in a localized area. While the flanges alone may bend along a crease line, the combination of the flange and the flexible member bend out across an extended area thus minimizing weak parts on the flanges. Thus, even though the flanges of hard resilient material are somewhat flexible, they have less memory than polyurethane, consequently under an extreme snagging situation the resilient wing-like flanges may remain in a deformed shape for some time. The memory in flexible member, or flexor action, is believed to greatly reduce the possibility of this deforming effect.

In both of the embodiments of FIG. 2 and FIG. 4 the retaining flanges which extend radially out are made from a hard resilient material yet the flanges are sufficiently thin as indicated by reference letter T in FIG. 2 so that the hard resilient material has flexibility to permit the retaining flanges to flex if the tag should contact an object. In the embodiment shown in which a hard resilient material is used for the head, shaft and retaining flanges, the thickness T of the rotating flange is 0.031". It should be pointed out that, since there is no appropriate measure of flexibility, the proper thickness of the flanges will have to be determined, based on the hard resilient material used to form the head, shaft and retaining flanges of the stud. Thus, the stud of the present invention, while made from a hard resilient material, (a material so hard and resilient it can be forced through an animal's ear) has the distinction of also being flexible in the flange area of the stud through forming the flanges in much the same manner one might form a leaf spring.

FIGS. 5 and 6 show the panel portion 60 of animal identification tag. The panel portion 60 comprises an identification area 62 having a boss 61 with an opening 63 for inserting the ear-piercing head 20 of the stud therethrough.

FIG. 7 illustrates the stud of the present invention after it has been inserted through the ear of an animal with panel 60 located on one side and stud 20 extending through the animal's ear 52 to illustrate that stud 20 remains in the animal's ear even though the flexible member 22 has fallen off stud 20. Note the extensions 13 (not shown), 14 and 15 extend radially outward from the shaft thereon and have sufficient length and rigidity to prevent the stud from being drawn through the animal's ear.

Thus, one of the advantages of the present invention is that it may act as a visual indicator that an animal may lose its ear tag; i.e., should the annular flexible member fall off the end of the stud, the identification panel and stud remains in the ear as shown in FIG. 7. The operator can then cut off stud 10 and replace it with a new tag, thus avoiding loss of identification of the animal.

Ear tag loss rates are subject to many factors, including field conditions, the time of year, where the animals are located, and what type of materials surround the animals. This is particularly true of primary ear tag losses occurring after initial installation of tags. Based on producers' requirements of low ear tag loss, it was determined any tags made from nonpolyurethane materials should have ear tag losses due to snagging at least as good as the all-polyurethane tags. In order to determine the ear tag loss rate with the present invention, it was necessary to prepare a side-by-side test to compare the loss rates with various ear tags. The comparison study was made between three different commercially available tags and the tag of the present invention as described herein. The commercially available tags comprised all-flexible two-piece tags such as shown in Murphy, et al. U.S. Pat. No. 3,741,414, the all-flexible tags shown in Fearing U.S. Pat. No. 4,209,924, and a commercially available tag which uses a solid stud of hard material with an annular flexible retainer surrounding a solid circular retaining flange located at one end of the stud. The field test was extended over approximately three months. In order to provide a severe test as possible, the test was conducted in feedlots where animals are confined and often rub heads against one another and against the feedlot pen fences.

The test was conducted in a feedlot with 400 animals. There were a total of 50 pens with eight animals in each pen. Since insecticide ear tags are often applied to each ear of the animal, each test animal received at least two ear tags.

The ear tag stud and panel of the present invention was applied to 56 animals located in seven different pens. A total of 120 tags were applied to the 56 animals. The total number of tags lost during the feedlot test was 3 (2.5% loss rate).

The commercially available tag shown in Fearing U.S. Pat. No. 4,209,924 was applied to 144 animals located in eighteen different pens. The total number of tags applied to the 144 animals was 288. The total number of tags lost in the feedlot was 12 (4.17% loss rate).

The commercially available tag shown in Murphy, et al. U.S. Pat. No. 3,741,414 was applied to 100 animals located in nine different pens. The total number of tags applied to the 100 animals was 200. The total number of tags lost in the feedlot test was 22 (11% loss rate).

The commercially available animal ear tag which has a hard solid spike and a hard circular retaining flange surrounded by an annular flexible member was applied to 100 animals located in 13 different pens. The total number of tags applied was 200. The total number of tags lost during the feedlot test was 36 (18% loss rate).

From the above test results it was evident that the feedlot test was a severe test since the number of tags lost in commercially available tags were considered high. Nevertheless, the test results revealed that applicant's present invention of animal ear tag using a hard resilient material had better near term retention than the all-flexible ear tags.

The primary loss rate of the present tag was surprising in that the purpose of the present invention was to eliminate the ear tag losses occuring after extended use of animal ear tags. Yet, surprisingly, the primary feedlot test loss of ear tags made from hard resilient material was found to be improved over the all-flexible studs. While the lower short term losses of the present invention are not fully understood, it nevertheless is apparent that the present invention provides an improved ear tag stud which reduces overall ear tag losses.

While different materials are useable with my invention, the polycarbonate and polyurethane combination are particularly beneficial since urethanes will bond to polycarbonates during the molding process.

I claim:

1. An animal identification tag comprising
a first member for receiving an ear tag stud;
an animal ear tag stud for piercing the ear of an animal;
said stud including a shaft of hard resilient material for extending through the ear of an animal, said shaft having a first end and a second end;
an ear-piercing tip of hard resilient material attached to one end of said shaft, said ear-piercing tip having sufficient hardness to permit an operator to force said ear-piercing tip through the ear of an animal;
a first retaining flange of hard resilient material attached to the opposite end of said shaft, said retaining flange extending out from said shaft to prevent withdrawal of said stud from an animal's ear, said first retaining flange having sufficient thinness to provide flexibility;
a second retaining flange of flexible material attached to said first retaining flange, said first flange and said second flange coacting to provide a flexible flange to reduce snagging of said animal ear tag.

2. The tag of claim 1 wherein said second flange is an annular flexible member attached to said first flange of said stud.

3. The tag of claim 2 wherein said first retaining flange comprise at least three members extending out from said shaft.

4. The tag of claim 2 wherein said second flange of flexible material comprises polyurethane molded around said first flange.

5. The tag of claim 2 wherein said flanges are made of plastic and said flanges have a thickness of approximately 0.031".

6. The tag of claim 2 wherein said flexible member comprises polyurethane.

7. The tag of claim 6 wherein said flexible member encapsulates said first retaining flanges.

8. The tag of claim 1 wherein said shaft is hollow for receiving a support pin for forcing said ear-piercing tip through the ear of an animal.

9. The tag of claim 1 wherein said ear-piercing tip is conical with a conical ear-piercing tip.

10. An animal ear tag stud for piercing the ear of an animal comprising:
a hollow shaft of hard resilient material for extending through the ear of an animal, said shaft having a first end and a second end;
a conical ear-piercing tip of hard resilient material attached to one end of said shaft, said ear-piercing tip having sufficient hardness to permit an operator to force said ear-piercing tip through the ear of an animal;
a plurality of flat leaf-like retaining flanges of hard resilient material attached to the opposite end of said shaft, said retaining flanges extending radially outward from said shaft to prevent withdrawal of said stud from an animal's ear, said retaining flanges having sufficient thinness to provide flexibility;

an annular retaining flange of flexible material attached to said plurality of flat leaf-like retaining flanges, said annular retaining flange coacting with said plurality of leaf-like retaining flanges to thereby reduce snagging of said animal ear tag.

11. The tag of claim 10 wherein said plurality of flat leaf-like retaining flanges are embedded in said flexible member.

12. The tag of claim 11 wherein said hard resilient material comprises polycarbonate and said flexible material comprises polyurethane.

13. The tag of claim 10 wherein said annular flange of flexible material comprises a visual indicator to alert a user that the animal ear tag needs replacement.

14. The tag of claim 10 wherein said shaft of hard resilient material is sufficiently rigid so as to permit an operator to drive ear piercing tip through an animal's ear by applying a driving force to the retaining flanges.

* * * * *